Patented Sept. 17, 1935

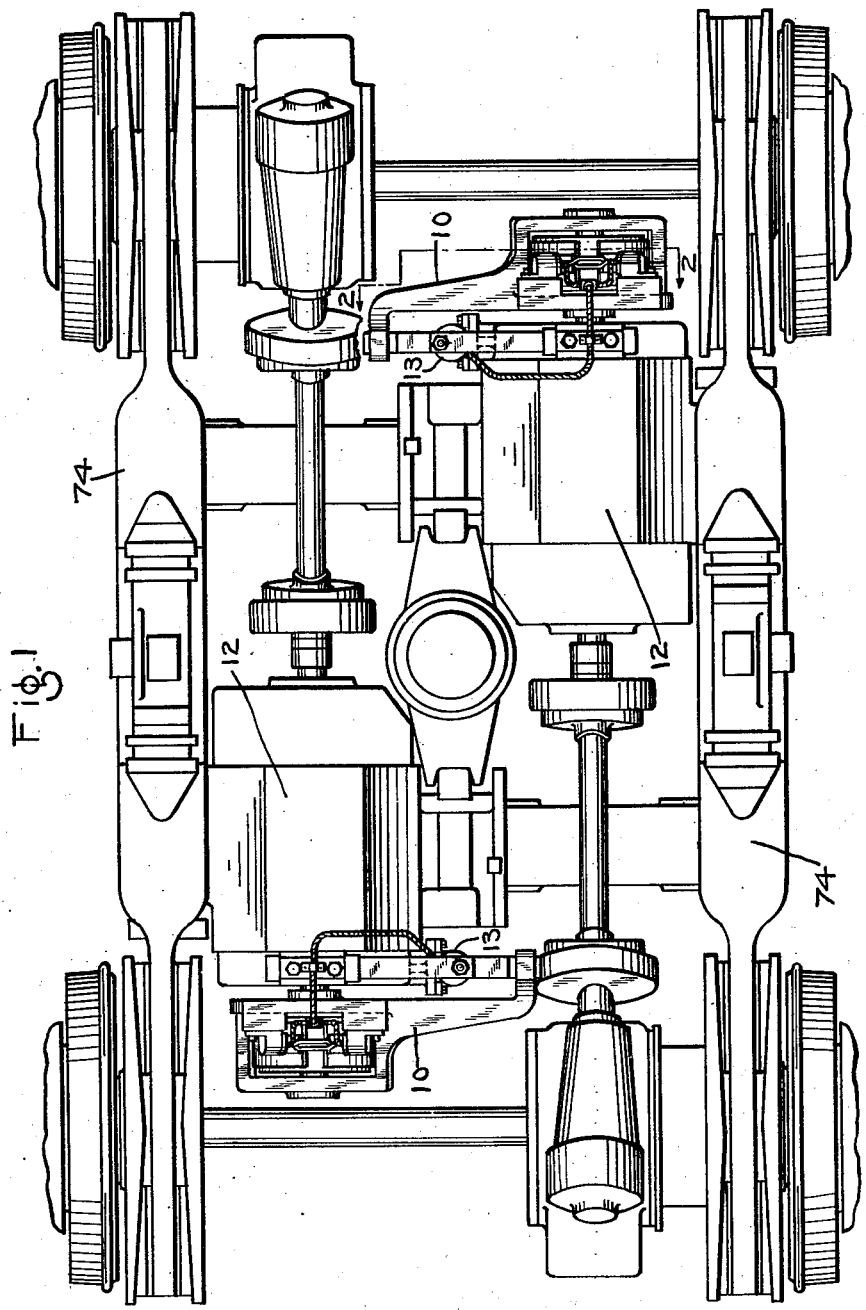

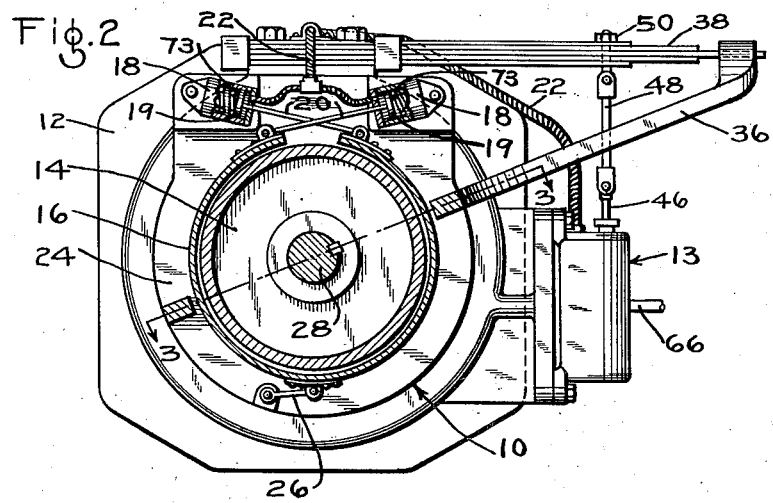
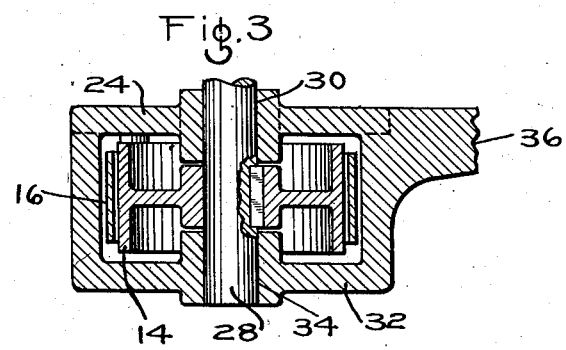
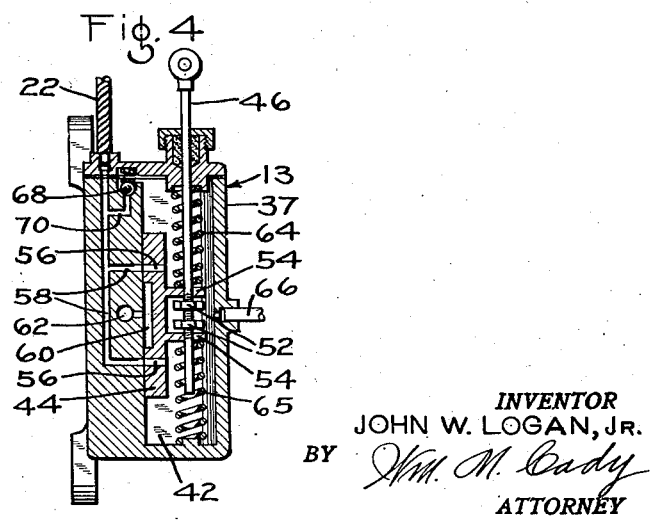

2,014,903

UNITED STATES PATENT OFFICE 2,014,903

FLUID PRESSURE BRAKE

John W. Logan, Jr., Wilkinsburg, Pa., assignor to The Westinghouse Air Brake Company, Wilmerding, Pa., a corporation of Pennsylvania Application December 22, 1933, Serial No. 703,533

12 Claims. (Cl. 188—181)

This invention relates to fluid pressure brake apparatus, and more particularly to brake apparatus in which the maximum braking effect produced is so controlled as to prevent wheel skidding.

It is a general object of this invention to provide a brake apparatus in which the braking force is automatically varied as the speed of the vehicle diminishes, so as to maintain a more nearly maximum rate of deceleration without skidding of the wheels.

It is another object of this invention to provide a brake apparatus of this character in which the braking force is controlled by means associated with the brakes and operated by the torque produced by a rotating brake member on a relatively stationary brake member.

Another object is to provide a brake apparatus in which the brakes are initially applied with a maximum braking force, which thereafter is automatically regulated in accordance with variations in the coefficient of friction between the rubbing parts of the friction brake, to prevent skidding of the vehicle wheels.

Other objects and advantages of my invention will be apparent from the following description, which is taken in connection with the attached drawings, in which, Fig. 1 is a plan view of a vehicle truck having motor driving means, to which has been adapted one embodiment of my invention.

Fig. 2 is an end elevation of the form of my invention illustrated in Fig. 1, in which certain parts have been cut away to more clearly indicate normally enclosed parts.

Fig. 3 is a view along the line 3—3 of Fig. 2.

Fig. 4 is a cross section view of a form of slide valve device used in connection with this embodiment.

In the embodiment illustrated I have provided a fluid pressure operated brake device 10 adapted to be associated with a driving motor 12, and a valve device 13 for controlling the supply of fluid under pressure to the brake device 10.

The brake device 10 is provided with a brake drum 14, which is preferably rigidly secured to the shaft of the drive motor 12, or to some other similar part which rotates as the vehicle moves. A brake band 16 is provided concentrically with the outer periphery of the brake drum 14, and is adapted to be contracted into frictional engagement with the brake drum by action of fluid under pressure in brake cylinders 18 upon pistons 19 connecting with the brake band through rods 20.

Fluid under pressure may be supplied to the brake cylinders through flexible pipe 22.

The brake cylinders 18 are carried on a torque plate 24, and the brake band 16 is connected to this plate by a link 26, so that when the brake band 16 is in frictional engagement with the brake drum 14, the force tending to rotate the brake band is resisted by a restraining force exerted by the torque plate through the link 26.

The torque plate 24 is rotatably disposed on the motor shaft 28, as at 30, and is provided with a bracket portion 32, also having a rotatable relation with the shaft 28, as at 34. The torque plate 24 thus tends to rotate when the brake band 16 is in frictional engagement with the rotor or brake drum 14, when rotating, if not restrained.

For restraining rotation of the torque plate 24, there is provided integral therewith an arm 36, which is slidably connected to one end of a restraining spring member 38. The spring member 38 is rigidly secured at its other end to the frame of the vehicle motor 12, or to some other part of the vehicle which remains stationary and relatively rigid when the vehicle is in motion, so that when the brakes are applied the tendency of the torque plate 24 to rotate is resisted by action of the spring 38.

For controlling the supply of fluid under pressure to the brake cylinder 18 in accordance with the flexure of the spring 38, there is provided the heretofore mentioned valve device 13, comprising a casing 37 defining a valve chamber 42, in which is disposed a slide valve 44. The slide valve 44 has associated therewith an actuating rod 46, which is connected to the spring 38 by a link 48 and a bolt 50. The rod 46 may be adjustably connected to the slide valve 44 by nuts 52, coacting with shoulders 54 integral with the slide valve. The slide valve 44 is provided with ports 56 adapted to register simultaneously with passages 58 in the casing. The slide valve is also provided with a cavity 60 for effecting communication between one of the passages 58 and an exhaust port 62, as will hereinafter be described.

For positioning the slide valve so that ports 56 are in registration with the passages 58 when the slide valve is not being actuated by movement of the rod 46, there are provided springs 64 and 65. These springs are adapted to always urge the slide valve toward the position where the ports in the slide valve register with the passages in the casing, so that fluid under pressure flowing to the valve chamber 42 by way of pipe 66 will enter ports 56 and from thence will flow to the brake cylinders 18 by way of passages 58 and the flexible piping 22.

Fluid under pressure may be supplied to the valve chamber 42 by any suitable means, such for example as by operation of any of the usual types of brake valve devices. Thus when spring 38 is in normally unflexed position, the brakes are applied by supplying fluid under pressure to the valve chamber 42.

It is desirable that the operator shall at all times be able to effect a release of the brakes by the usual operation of the brake valve device, but if the slide valve 44 should happen to be in a position where the ports 56 therein are out of registration with the passages 58 leading to the brake cylinders, and the cavity 60 has not as yet brought one of the passages 58 and the exhaust port 62 into communication, the fluid pressure supply would be lapped and the operator could not release the brakes.

In order to permit release of the brakes regardless of the position of the slide valve, a by-pass passage 70 is provided which connects passage 58 with valve chamber 42. Disposed in the passage 70 is a ball check valve 68 for preventing back flow from the chamber 42 to the passage 58, but when pressure is exhausted from the valve chamber 42 and the slide valve 44 is in lap position, the pressure in the brake cylinders 18 will be sufficient to unseat the check valve 68 and permit fluid pressure in the brake cylinder to be released to the atmosphere by way of piping 22, passage 58, passage 70, the valve chamber 42, the pipe 66, and thence back to the control brake valve device.

The brakes are held in release position by action of springs 73 in the brake cylinders 18, in the manner well known to those skilled in the art. While the arrangement of the brake cylinders 18 in connection with operation of the brake band 16 has been somewhat diagrammatically indicated, for the sake of clearness, it is to be understood that I contemplate the use of brake cylinders and brake band operating levers such as are commonly used in connection with fluid pressure brakes of this type.

Brake apparatus embodying my invention, may be adapted to a vehicle in a number of ways, such for example as is shown in Fig. 1. As there shown, two driving motors 12 are connected to two axles of a vehicle truck 14, and each motor has associated therewith a brake device 10.

The operation of the apparatus shown and described is as follows: When the brakes are in release position, the slide valve 44 will be positioned by the springs 64 and 65 so that ports 55 and passages 58 are in registration. When it is desired to effect an application of the brakes, fluid under pressure is supplied to the valve chamber 42 to a degree in accordance with the desired degree of braking. Fluid under pressure will, therefore, flow from the chamber 42 through ports 56 and passages 58, and from thence through piping 22 to the brake cylinders 18. The brake band 16 will thus be caused to contract around the brake drum 14 and produce a frictional braking effect thereon.

Assuming that the brake drum is rotating in a counterclockwise direction, it will exert a torque or turning effort on the brake band 16. Since the brake band 16 is connected to the torque plate 24 by link 26, this turning effort will be transmitted to the torque plate 24, which in turn will rotate the arm 36 against resistance of spring 38. The spring 38 will, therefore, be flexed upwardly, thereby moving the slide valve 44 upwardly also. Assuming that this movement of the slide valve is just sufficient to bring the ports 56 and passages 58 out of registration, but not far enough to bring the cavity 60 into registration with the upper passage 58, the fluid supply to the brake cylinders will be lapped.

As the vehicle slows down the coefficient of friction between the brake band 16 and the rotor 14 will increase, so that for a given braking force the turning effort exerted on the brake band will be increased, and the spring 38 will be flexed upwardly a greater distance. This upward movement of the spring 38 may be a gradual movement, or it may occur somewhat rapidly, depending upon the rate at which the coefficient of friction increases. If the coefficient of friction is continuously increasing, the spring 38 will move upwardly continuously until the cavity 60 in the slide valve 44 brings the upper passage 58 in communication with the exhaust port 62, thereby releasing fluid pressure in the brake cylinder 18 to the atmosphere. The braking force will, therefore, be diminished, and consequently the turning effort exerted on the brake band 16, so that the pressure flexing the spring 38 upwardly will be diminished. As the spring 38 moves downwardly the slide valve 44 is again moved to lap position, and for continued downward movement of the spring 38, the slide valve is again moved to the position for admission of fluid under pressure to the brake cylinders, whereupon the brakes are again applied.

The coefficient of friction between the brake band 16 and the brake drum 14 varies, and whether due to variations in speed or to other causes, the spring 38 will be flexed upwardly or downwardly to control the supply of fluid to the brake cylinders in accordance therewith. It will, therefore, be obvious that it becomes a mere matter of design to so proportion the parts for a given vehicle so that the braking force may be varied to maintain a rate of deceleration which will bring the vehicle to a stop quickly and smoothly without skidding of the wheels.

If the operator desires to effect a release of the brakes, he operates the usual brake valve device so as to release fluid from the valve chamber 42, whereupon fluid under pressure is released from the brake cylinders 18 by way of passages 58 and ports 56 if the slide valve 44 is in its normal position. If the ports 56 happen to be lapped, then fluid is released from the brake cylinders by way of the by-pass 70 and past the check valve 68 to the valve chamber 42.

If the direction of rotation of the brake drum 14 is opposite to that assumed in the foregoing description, the operation of the apparatus for that direction will be substantially as just described.

When braking a vehicle while in motion, the force of inertia causes the vehicle to tilt, with the result that a greater load is imposed upon the axles adjacent the front end of the vehicle than is imposed upon the axles adjacent the rear of the vehicle. The brakes associated with the front axles may, therefore, be applied with a greater braking force than the brakes associated with the rear axles, without danger of wheel skidding.

With my invention it is possible to effect a greater braking force on the front axles than on the rear axles of a vehicle, by adjusting the nuts 52 on the rod 46 differently for the different valve devices associated with the different brakes, so that due to the lost motion a greater movement of the rod 46 relative to the slide valve 44, before the rod operates the slide valve, is provided at the front axles than at the rear axles. As a result, it requires a greater braking force at the front axles than at the rear axles to cause flexing of the spring 38 sufficiently to move the slide valve so as to restrict the flow area at the ports 56.

It will also be obvious that one adjustment of the nuts 52 will produce this effect for both directions of travel of the vehicle. Assuming for example a vehicle having one front axle and one rear axle, and that when the vehicle is traveling in a forward direction the shafts 28 are rotating in a clockwise direction, then the valve device 13 associated with the front axle may have the upper adjusting nut 52 screwed up against the upper lug 54 while the lower adjusting nut 52 may remain as shown in Figure 4. The valve device 13 associated with the rear axle will then have its lower nut 52 screwed down against lower lug 54, while the upper adjusting nut 52 may remain in the position shown in Figure 4.

Therefore, when fluid under pressure is supplied to the brake cylinders associated with the forward and rear axles, the forward and rear springs 38 will be flexed initially to the same degree. The slide valve 44 in the valve device 13 associated with the rear axle will then be actuated downwardly to cut off the supply to the rear brake cylinders before the slide valve in the forward valve device has been actuated to cut off the supply to the forward brake cylinders. The braking on the front axle will therefore be to a degree greater than on the rear axle.

When the vehicle is traveling in the opposite direction, it will be quite obvious that due to the adjustments of the nuts 52 aforementioned, the slide valve 44 of the valve device associated with the rear axle, which was formerly the front axle, will move upwardly to cut off the supply to the rear brake before the supply is cut off to the forward brake.

While one embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake apparatus, the combination with a brake device, of torque means movable by actuation of said device, resilient means opposing movement of said torque means, and a valve device operable by said resilient means for controlling operation of said brake device and providing for one degree of operation of said brake device for one direction of travel of a vehicle and for another degree of operation for an opposite direction for like actuation of said torque means.

2. In a vehicle brake apparatus, the combination with a fluid pressure brake device, of a valve device for controlling fluid under pressure supplied to operate said brake device, torque means responsive to operation of said brake device for controlling operation of said valve device, and means providing for relative lost motion to one degree between operation of said torque means and said valve device for one direction of rotation and to a different degree for like operation of said torque means in the opposite direction.

3. In a vehicle brake apparatus, the combination with a rotatable brake element and a relatively fixed brake element, of means operable by fluid under pressure for causing said fixed element to engage said rotatable element, resilient means for yieldingly opposing movement of said relatively fixed element, means operated by the yielding movement of said resilient means for regulating the fluid pressure supplied to operate said first means, and means providing for lost motion between movement of said resilient means and said regulating means, said lost motion being greater for one direction of rotation of said rotatable element than for the opposite direction.

4. In a vehicle brake apparatus, the combination with a plurality of vehicle axles, of fluid pressure brake devices associated with said axles, each of said brake devices having a relatively stationary and a rotatable member, resilient means movable by relative movement between said stationary and rotatable members, and valve devices operable by movement of said resilient means for effecting a supply of fluid under pressure to each of said brake devices at different rates to produce different braking effects on each of said axles.

5. In a vehicle brake apparatus, the combination with a rotatable brake element, a friction brake element adapted to engage said rotatable element, and a brake cylinder for urging said friction element into engagement with said rotatable element, of a torque plate member, means connecting said torque plate member with said friction brake element whereby said torque plate member and said friction brake element are urged to rotate when said friction brake element is in engagement with said rotatable element, resilient means opposing rotation of said torque plate member, valve means controlling the supply of fluid under pressure to and its release from said brake cylinder, and means for actuating said valve means upon movement of said torque plate member, said means being adapted to actuate said valve means to one degree for a given movement of said torque plate member in one direction and to a greater degree upon a like movement of said torque plate member in an opposite direction.

6. In a vehicle brake system, the combination with a brake cylinder, of brake means operated by said brake cylinder, a valve device for controlling the supply of fluid under pressure to said brake cylinder and having ports adapted to be normally in register, a member adapted to be actuated in one of two directions according to the degree of braking effect produced by said braking means, and means operably adjustable whereby movement of said last member to a given degree in one direction actuates said valve device to bring said ports fully out of register and whereby movement of said last member in the opposite direction to the same degree actuates said valve device to bring said ports only partially out of register.

7. In a vehicle brake apparatus, in combination, a brake device, a flexible member adapted to be flexed in either of two directions to a degree according to the degree of braking effect produced by said brake device, a valve mechanism having a slide valve for controlling operation of said brake device, and means connecting said slide valve with said flexible member and operable to actuate said slide valve to one degree for a given movement of said flexible member in one direction and to a different degree for the same movement of said flexible member in the opposite direction.

8. In a vehicle brake apparatus, the combination with a brake device having a brake cylinder, of a leaf type spring, means for flexing said spring to a degree in accordance with the degree of braking effect produced by said brake device, a valve device having a slide valve for controlling the supply of fluid under pressure to said brake cylinder, a pair of springs for normally positioning said slide valve in a biased position, a link mechanism connected to said spring and having a lost motion driving connection with said slide valve and operable to actuate said slide valve from said biased position against opposition of one of said springs.

9. In a vehicle brake apparatus, the combination with a vehicle driving motor having a shaft, of a rotatable member secured to said shaft, a torque plate member rotatably disposed on said shaft, a friction brake element adapted to engage said rotatable member, means connecting said friction brake element to said torque plate member, a leaf type spring having one end thereof secured to said motor and the other end thereof secured to said torque plate member, a brake cylinder for operating said friction brake element, a valve device for controlling the supply of fluid under pressure to said brake cylinder, and means for actuating said valve device in accordance with the flexure of said spring.

10. In a vehicle brake apparatus, the combination with a brake device having a brake cylinder, of a valve device having a chamber and a slide valve for controlling a communication from said chamber to said brake cylinder, means for actuating said slide valve to close said communication in accordance with the braking effect produced by said brake device, and a check valve adapted to permit a back flow of fluid under pressure from said communication to said chamber.

11. In a vehicle brake apparatus, the combination with a brake device having a brake cylinder, of a valve device for controlling the supply of fluid under pressure to said brake cylinder, said valve device having a valve chamber and a plurality of passages leading from said chamber to a communication leading to said brake cylinder and a slide valve in said chamber for controlling said passages, a spring member adapted to be flexed to a degree according to the degree of braking effect produced by said brake device, a link mechanism connecting said slide valve to said spring member and adapted to actuate said slide valve to close said passages when said spring is flexed, a by-pass passage leading from said brake cylinder communication to said chamber, and a check valve device in said by-pass passage adapted to prevent flow of fluid from said chamber to said brake cylinder communication and operable to permit flow from said brake cylinder communication to said chamber.

12. In a vehicle brake apparatus, the combination with a plurality of vehicle axles, of fluid pressure brake devices associated with said axles, each of said brake devices having a rotatable member and a friction brake element adapted to engage said rotatable member, resilient means adapted to be stressed when said friction elements engage said rotatable members, a plurality of valve devices for controlling the supply of fluid under pressure to said fluid pressure brake devices, means connecting said resilient means with said valve devices and providing for operation of each of said valve devices to a different degree for a given stress of said resilient means, whereby each brake device produces a different braking effect from the other brake devices.

JOHN W. LOGAN, Jr.